United States Patent
Farooq et al.

(10) Patent No.: US 12,036,943 B2
(45) Date of Patent: Jul. 16, 2024

(54) LOAD-LIMITING ASSEMBLY FOR SEATBELT

(71) Applicant: Ford Global Technologies, LLC, Dearborn, MI (US)

(72) Inventors: S. M. Iskander Farooq, Novi, MI (US); Mohammad Omar Faruque, Faruque, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/932,683

(22) Filed: Sep. 16, 2022

(65) Prior Publication Data
US 2024/0092310 A1  Mar. 21, 2024

(51) Int. Cl.
  *B60R 22/20* (2006.01)
  *B60R 22/24* (2006.01)
  *B60R 22/44* (2006.01)

(52) U.S. Cl.
  CPC ........... *B60R 22/201* (2013.01); *B60R 22/24* (2013.01); *B60R 22/44* (2013.01)

(58) Field of Classification Search
  CPC ....... B60R 22/18; B60R 22/20; B60R 22/201; B60R 22/24; B60R 22/44
  See application file for complete search history.

(56) References Cited

U.S. PATENT DOCUMENTS

| 2,680,476 A | 6/1954 | Saffell |
| 4,027,905 A | 6/1977 | Shimogawa et al. |
| 5,234,181 A | 8/1993 | Schroth |

(Continued)

FOREIGN PATENT DOCUMENTS

| CN | 108608984 A | 10/2018 |
| CN | 208855587 U | 5/2019 |

(Continued)

OTHER PUBLICATIONS

Non-Final Office Action for U.S. Appl. No. 17/750,627, filed May 23, 2022, as issued by the UPSTO on Jun. 14, 2023.

(Continued)

*Primary Examiner* — Jason D Shanske
*Assistant Examiner* — Daniel M. Keck
(74) *Attorney, Agent, or Firm* — Frank A. MacKenzie; Bejin Bieneman PLC (57) ABSTRACT

An assembly includes a vehicle pillar elongated along an axis. The assembly includes seatbelt retractor and a webbing retractably extendable from the retractor. The seatbelt retractor is lockable from an unlocked position in which the webbing is extendable from and retractable into the retractor to a locked position in which the retractor restricts extension of the webbing from the retractor. The assembly includes a frame supported by the pillar and defining a slot elongated along the axis of the pillar. The slot has a terminal upper end. The assembly includes a seatbelt guide slideably engaged with the slot. The seatbelt retractor is below the seatbelt guide. The webbing extends upwardly from the seatbelt retractor around the seatbelt guide. The assembly includes a spring between the frame and the seatbelt guide. The spring biases the seatbelt guide against the terminal upper end of the slot.

17 Claims, 8 Drawing Sheets

(56) References Cited

U.S. PATENT DOCUMENTS

| | | |
|---|---|---|
| 5,265,908 A | 11/1993 | Verellen et al. |
| 5,566,978 A | 10/1996 | Fleming et al. |
| 5,700,034 A | 12/1997 | Lane, Jr. |
| 6,099,078 A | 8/2000 | Smithson et al. |
| 6,129,385 A | 10/2000 | Blackadder |
| 6,145,881 A | 11/2000 | Miller, III et al. |
| 6,209,916 B1 | 4/2001 | Smithson et al. |
| 6,336,664 B1 | 1/2002 | Roder |
| 6,736,427 B2 | 5/2004 | Herrmann et al. |
| 6,913,288 B2 | 7/2005 | Schulz |
| 6,935,701 B1 | 8/2005 | Arnold et al. |
| 7,226,120 B2 | 6/2007 | Yamazaki |
| 7,331,610 B2 | 2/2008 | Herrmann |
| 8,800,735 B2 | 8/2014 | Ruthinowski et al. |
| 8,820,789 B2 | 9/2014 | Merrill et al. |
| 9,027,964 B2 | 5/2015 | Neero et al. |
| 9,238,448 B2 | 1/2016 | Wier et al. |
| 9,499,121 B2 | 11/2016 | Dingman et al. |
| 9,738,248 B2 | 8/2017 | Dingman et al. |
| 9,809,193 B2 | 11/2017 | Marriott et al. |
| 10,953,847 B2 | 3/2021 | Hamilton et al. |
| 10,981,537 B2 | 4/2021 | Vega et al. |
| 11,273,790 B2 | 3/2022 | Hamilton et al. |
| 11,505,159 B2 | 11/2022 | Jaradi et al. |
| 11,639,153 B2 | 5/2023 | Farooq et al. |
| 2003/0116954 A1 | 6/2003 | Singer |
| 2004/0256851 A1* | 12/2004 | Herrmann ........... B60R 22/1951 280/806 |
| 2005/0206215 A1 | 9/2005 | Arnold et al. |
| 2011/0133439 A1 | 6/2011 | Pearce |
| 2012/0216524 A1* | 8/2012 | Browne .............. F03G 7/06145 60/527 |
| 2014/0042282 A1 | 2/2014 | Neero et al. |
| 2017/0267208 A1 | 9/2017 | Marriott et al. |
| 2018/0222440 A1 | 8/2018 | Grzic et al. |
| 2020/0238948 A1 | 7/2020 | Williams |
| 2020/0339063 A1 | 10/2020 | Jaradi et al. |

FOREIGN PATENT DOCUMENTS

| | | |
|---|---|---|
| FR | 2695603 A1 | 3/1994 |
| GB | 2382802 A | 11/2003 |
| KR | 20020027901 A | 4/2002 |
| KR | 102260808 B1 | 6/2021 |
| WO | 2009082304 A1 | 7/2009 |

OTHER PUBLICATIONS

Non-Final Office Action dated Dec. 8, 2022 re U.S. Appl. No. 17/748,079, filed May 19, 2022.

Non-Final Office Action for U.S. Appl. No. 17/750,627, filed May 23, 2022, as issued by the USPTO Feb. 2, 2023.

* cited by examiner

LOAD-LIMITING ASSEMBLY FOR SEATBELT

BACKGROUND

A seatbelt in a vehicle may be equipped with "load-limiting" features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression.

DETAILED DESCRIPTION

With reference to the Figures, wherein like numerals indicate like parts throughout the several views, an assembly (referred to hereinafter as a "load-limiting assembly 10") includes a vehicle pillar 14 elongated along an axis A. The assembly 10 includes a seatbelt retractor 16 and a webbing 18 retractably extendable from the retractor 16. The seatbelt retractor 16 is lockable from an unlocked position in which the webbing 18 is extendable from and retractable into the retractor 16 to a locked position in which the retractor 16 restricts extension of the webbing 18 from the retractor 16. A seatbelt guide 20 is supported by the pillar 14. The load-limiting assembly 10 includes a frame 44 supported by the pillar 14 and defining a slot 50 elongated along the axis A of the pillar 14. The slot 50 has a terminal upper end 76. The load-limiting assembly 10 includes a seatbelt guide 20 slideably engaged with the slot 50. The seatbelt retractor 16 is below the seatbelt guide 20. The webbing 18 extends upwardly from the seatbelt retractor 16 around the seatbelt guide 20. The load-limiting assembly 10 includes a spring 22 between the frame 44 and the seatbelt guide 20. The spring 22 biases the seatbelt retractor 16 against the terminal upper end 76 of the slot 50.

Since the spring 22 biases the seatbelt guide 20 against the terminal upper end 76 of the slot 50, the spring 22 resiliently supports the seatbelt guide 20. In other words, the weight of the seatbelt guide 20 is supported by the spring 22 on the frame 44 and the seatbelt guide 20 can load the spring 22 when the webbing 18 applies force to the seatbelt guide 20 exceeding a load-limiting threshold. Specifically, during sudden deceleration of the vehicle 12, e.g., during a vehicle impact, an occupant may be urged in the vehicle-forward direction. When the occupant is urged in the vehicle-forward direction, the occupant exerts a force on the webbing 18. In such an instance, the retractor 16 restricts payout of the webbing 18 and the webbing 18 controls the kinematics of the occupant. As a result, the force is exerted by the occupant through the webbing 18 to the seatbelt guide 20. When the force exerted by the occupant is above the load-limiting threshold, the spring 22 is compressed between the between the seatbelt guide 20 and the frame 44 as the seatbelt guide 20 moves downwardly. This movement of the seatbelt guide 20 releases tension on the webbing 18 against the occupant. Specifically, the movement of the seatbelt guide 20 against the bias of the spring 22 reduces loads applied by the webbing 18 against the chest of the occupant. After release of the force from the seatbelt guide 20 by the webbing 18, the spring 22 returns the seatbelt guide 20 to the terminal upper end 76 of the slot 50. In other words, the load-limiting assembly 10 is resettable.

Figure 7:
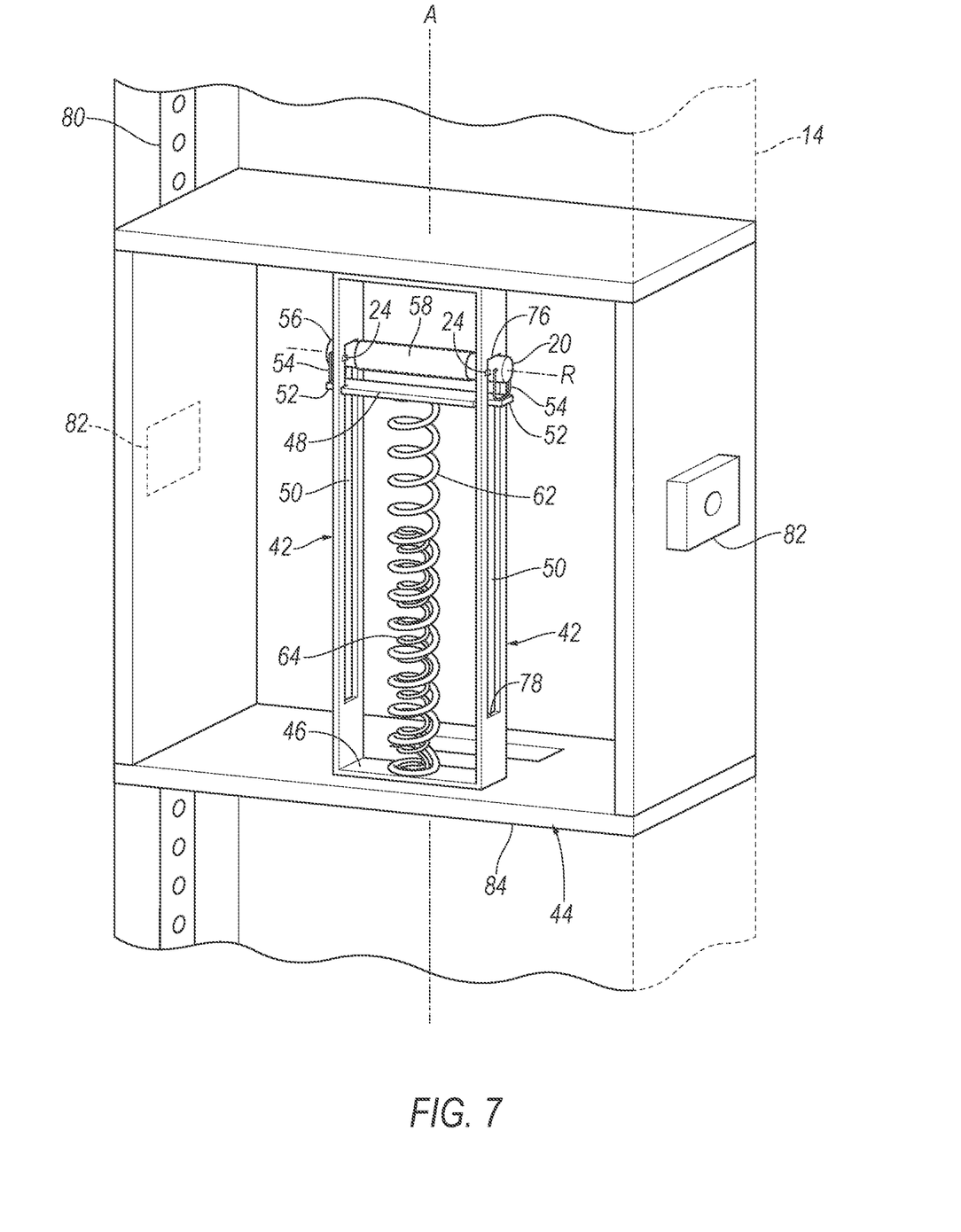
FIG. 7 is another example of the load-limiting assembly including two springs.
Figure 8:
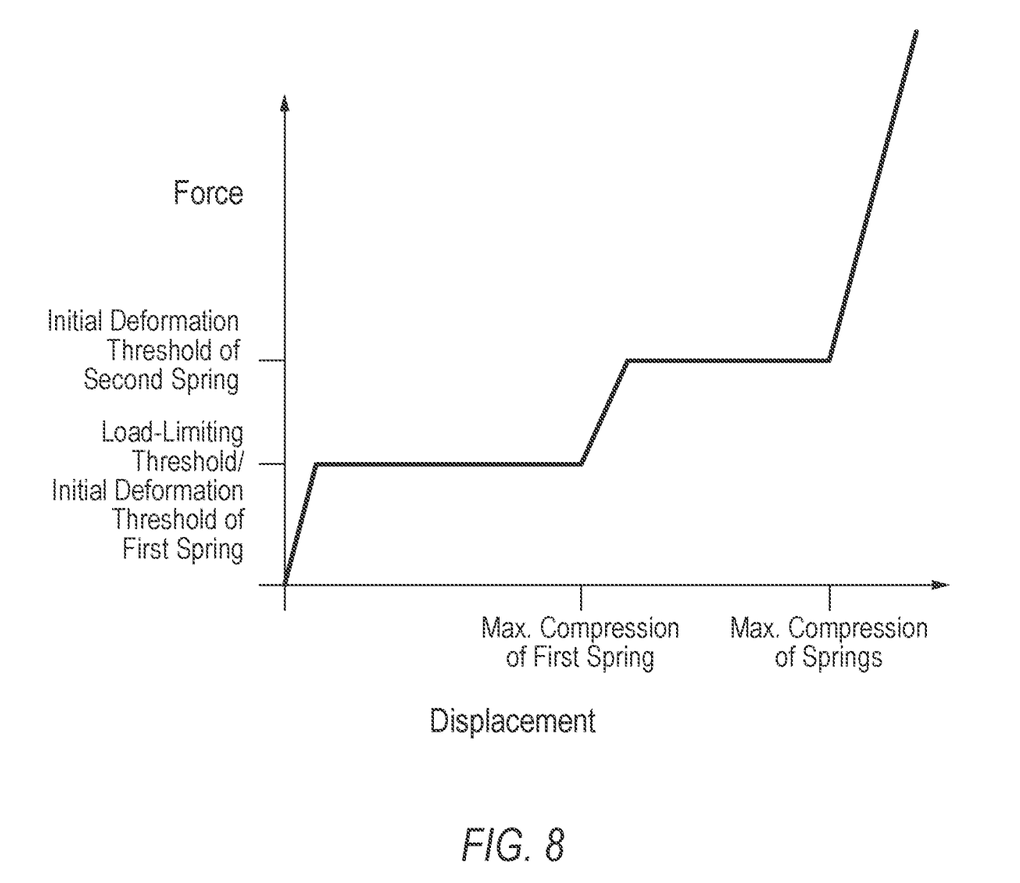
FIG. 8 is a hypothetical graph showing operation of the example of the load-limiting assembly of FIG. 7.

Two examples of the load-limiting assembly 10 are shown in the Figures and these examples are shown merely by way of example. Specifically, one example of the load-limiting assembly 10 is shown in FIGS. 2-6 in which the spring 22 is a coil spring 60. Another example of the load-limiting assembly 10 is shown in FIGS. 7-8 in which the spring 22 includes two springs operating in conjunction namely, a first coil spring 62 and a second coil spring 64.

The vehicle 12 may be any suitable type of ground vehicle 12, e.g., a passenger or commercial automobile such as a sedan, a coupe, a truck, a sport utility, a crossover, a van, a minivan, a taxi, a bus, etc. The vehicle 12 includes a vehicle frame and a vehicle body. The vehicle body may be of unibody construction, in which the vehicle frame is unitary with the vehicle body including frame rails, rockers, pillars 14, roof rails, etc. As another example, the vehicle body and vehicle frame may have a body-on-frame construction (also referred to as a cab-on-frame construction) in which the vehicle body (including rockers, pillars 14, roof rails, etc.) and vehicle frame are separate components, i.e., are modular, and the vehicle body is supported on and affixed to the vehicle frame. Alternatively, the vehicle frame and vehicle body may have any suitable construction. The vehicle frame and the vehicle body may be of any suitable material, for example, steel, aluminum, and/or fiber-reinforced plastic, etc.

Figure 1:
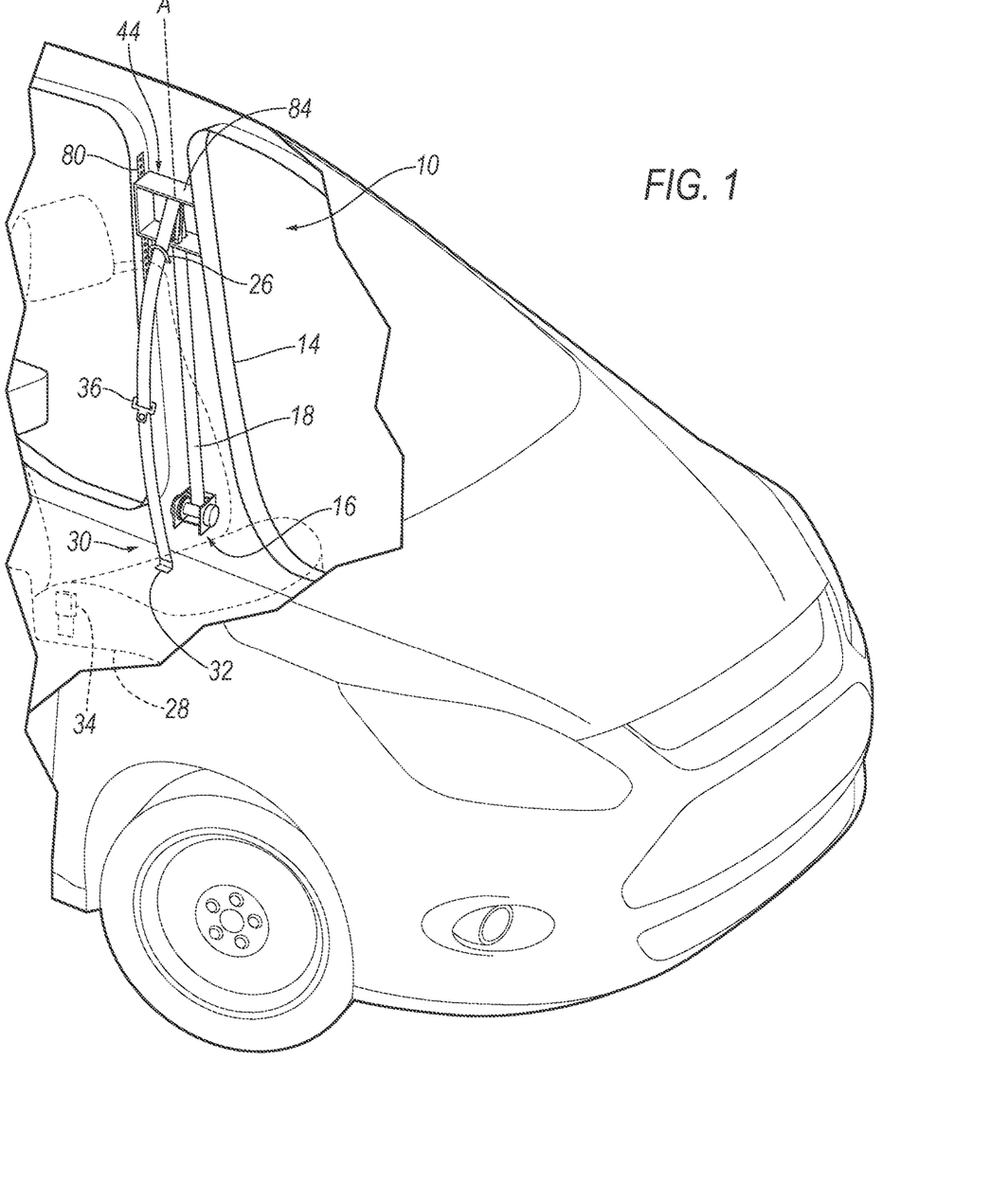
FIG. 1 is a perspective view of a portion of a vehicle with a seatbelt assembly and a load-limiting assembly on a pillar of the vehicle.

With reference to FIG. 1, the vehicle body includes at least one pillar 14. For example, the vehicle body may include an A-pillar and a B-pillar on each side of the vehicle 12. The pillars 14 are elongated along the axis A. The axis A is upright. The axis A may be generally vertical. The vehicle body may include a roof and a floor of the vehicle 12. The roof and the floor are spaced from each other along the axis A. The pillars 14 extend upwardly from the floor to the roof. The vehicle 12 may include a D-ring 26 on the pillar 14 and/or trim on the pillar 14 to guide the webbing 18 (FIG. 1).

The vehicle frame and/or the vehicle body defines a passenger compartment to house occupants of the vehicle 12. The passenger compartment may extend across the vehicle 12, i.e., from one side to the other side of the vehicle 12. The passenger compartment includes one or more seats 28. The seats 28 may be arranged in any suitable manner in the passenger compartment. The seats 28 may be of any suitable type, e.g., a bucket seat as shown in the Figures.

The vehicle 12 includes a seatbelt assembly 30. In the example shown in FIG. 1, one seatbelt assembly 30 is shown in the B-pillar for use by an occupant of the seat 28 adjacent the B-pillar. The vehicle 12 may include any suitable number of seatbelt assemblies and corresponding load-limiting assemblies 10 at any suitable location in the passenger compartment.

With continued reference to FIG. 1, the seatbelt assembly 30 includes the seatbelt retractor 16 and the webbing 18 retractably extendable from the retractor 16. The seatbelt assembly 30 may include an anchor 32 fixed to the webbing 18 and the vehicle body, e.g., the floor. The seatbelt assembly 30 may include a buckle 34 fixed to the vehicle body, e.g., the floor, and a clip 36 that releasably engages a buckle 34. The webbing 18 may extend continuously from the seatbelt retractor 16 to the anchor 32. For example, one end of the webbing 18 feeds into the seatbelt retractor 16, and the other end of the webbing 18 is fixed to the anchor 32. When the buckle 34 is engaged with the clip 36, the webbing 18 controls the kinematics of the occupant of the seat 28 during sudden deceleration, e.g., during vehicle impact.

The webbing 18 may be fabric, e.g., polyester. The clip 36 slides freely along the webbing 18 and, when engaged with the buckle 34, divides the webbing 18 into a lap band and a shoulder band in the example shown in the figures. Specifically, the seatbelt assembly 30 may be a three-point harness, meaning that the webbing 18 is attached at three points around the occupant when fastened: the anchor 32, the seatbelt retractor 16, and the clip 36. The seatbelt assembly 30 may, alternatively, include another arrangement of attachment points.

The seatbelt retractor 16 is below the seatbelt guide 20. The seatbelt retractor 16 may be supported at any suitable location in the vehicle 12 below the seatbelt guide 20. For example, the seatbelt retractor 16 may be supported by and fixed to the pillar 14, e.g., with fasteners. Since the retractor 16 is below the seatbelt guide 20, the webbing 18 extends upwardly from the retractor 16 and around the seatbelt guide 20.

The seatbelt retractor 16 includes a housing 38 and a spool 40 rotatably supported by the housing 38. The seatbelt webbing 18 is coiled about the spool 40. The spool 40 is selectively rotatable relative to the housing 38 to pay out and retract the seatbelt webbing 18 relative to the spool 40. The spool 40 may be spring 22-loaded relative to the housing 38, e.g., with a spring 22 between the spool 40 and the housing 38, to automatically retract slack from the seatbelt webbing 18.

The seatbelt retractor 16 is lockable from an unlocked position in which the webbing 18 is extendable from and retractable into the retractor 16 to a locked position in which the retractor 16 restricts extension of the webbing 18 from the retractor 16. In the locked position, the retractor 16 may prevent extension of the webbing 18 from the retractor 16. The seatbelt retractor 16, in some examples, may be moveable from an unlocked position to a locked position by conventional mechanisms known in the art. The seatbelt retractor 16 may be in the unlocked position by default, i.e., in the absence of a sudden deceleration. The seatbelt retractor 16 may change from the unlocked position to the locked position during a sudden deceleration of the vehicle 12, i.e., deceleration triggers components of the seatbelt retractor 16 to change from the unlocked position to the locked position.

The seatbelt assembly 30 may include a locking device engageable with the spool 40 to restrict payout of the webbing 18 from the seatbelt retractor 16. In the unlocked position, the locking device allows payout of the webbing 18 from to the seatbelt retractor 16 and, in the locked position, the locking device restricts payout of the webbing 18 from the seatbelt retractor 16, e.g., prevents payout. The locking device may be any suitable locking device including those known in the art, e.g., weighted pendulum/pawl, centrifugal clutch, etc. With the spool 40 in the unlocked position, the seatbelt webbing 18 may be extended from and retracted into the seatbelt retractor 16. In other words, the seatbelt webbing 18 may be coiled and uncoiled freely about the spool 40. With the spool 40 in the locked position, the seatbelt retractor 16 controls extension of the seatbelt webbing 18 to control the kinematics of the occupant. Specifically, the spool 40 is locked relative to the housing 38. In some examples, the seatbelt retractor 16 may include a torsion bar including known structures in some examples, that allows for a limited amount of payout of the seatbelt webbing 18 and, in some examples, the seatbelt retractor 16 does not include a torsion bar and may prevent payout in the locked position as the load-limiting assembly 10 eliminates the need for a torsion bar. The spool 40 may be in the unlocked position by default, i.e., in the absence of a sudden deceleration. The spool 40 may change from the unlocked position to the locked position during a sudden deceleration of the vehicle 12. Specifically, the locking device may engage the spool 40 in response to deceleration of the vehicle 12, e.g., a sudden slowing of the vehicle 12, sudden stop, vehicle impact, etc. In other words, the locking device may be moved from the unlocked position to the locked position by vehicle deceleration. The locking device may engage the spool 40 in response to an activation sensor. The activation sensor senses sudden deceleration of the vehicle 12 and triggers activation of the locking device, i.e., moves the locking device to the locked position. As one example, the activation sensor may be in the seatbelt retractor 16 and may be, for example, a weighted pendulum, a centrifugal clutch, or any other suitable type.

The seatbelt buckle 34 releasably engages the clip 36, and specifically a latch plate of the clip 36. The seatbelt buckle 34 may include, for example, a slot, a latch, a release button, and/or other suitable structure. The release button may be spring 22 loaded, as is known. The latch plate may be engaged with the seatbelt buckle 34 upon insertion into the slot. For example, the clip 36 may engage an opening defined by the latch plate and inhibit removal of the latch plate from the slot. Actuation of the release button may disengage the latch plate from the seatbelt buckle 34. For example, depression of the release button may disengage the seatbelt buckle 34 from the opening defined by the latch plate and permit removal of the latch plate from the slot 50.

The load-limiting assembly 10 reduces the load applied by the webbing 18 to the occupant. During a vehicle impact, as described above, the retractor 16 may prevent or limit the extension of the webbing 18 of the seatbelt assembly 30 from the retractor 16. The load-limiting assembly 10 allows for a predetermined, limited amount of release of the webbing 18 relative to the occupant when the force exerted on the webbing 18 by the occupant exceeds the load-limiting threshold. This limited release of the webbing 18 limits the load applied by the webbing 18 to the chest of an occupant, which may limit chest compression. The operation of the load-limiting assembly 10 is dependent upon the size of the occupant, e.g., the weight of the occupant. In other words, at a given speed of the vehicle impact, a large occupant may exert a load on the webbing 18 exceeding the load-limiting threshold whereas, at that same speed, the load exerted on the webbing 18 by a small occupant may not exceed the load-limiting threshold.

The load-limiting assembly 10 includes the seatbelt guide 20, the frame 44, and the spring 22. The frame 44 includes a track 42 supporting the seatbelt guide 20 on the pillar 14. The track 42 includes the slot 50. The load-limiting assembly 10 may include a housing 84 and in such examples the frame 44 may be fixed to the housing 84 and/or parts of the frame 44 may be unitary with the housing 84, i.e., a single, uniform piece of material with no seams, joints, fasteners, or adhesives holding them together. In such examples, parts of the frame 44 and housing are formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The webbing 18 of the seatbelt assembly 30 extends upwardly from the seatbelt retractor 16, over the seatbelt guide 20, and downwardly to the anchor 32 that connects the webbing 18 to the vehicle body. The clip 36 of the seatbelt assembly 30 is between the seatbelt guide 20 and the anchor 32. During operation, the webbing 18 slides and/or rolls across the seatbelt guide 20 as webbing 18 is extended from and retracted into the seatbelt retractor 16. During sudden deceleration of the vehicle 12, the seatbelt retractor 16 is triggered to the locked position, as described above, and the force of the occupant is exerted on the seatbelt guide 20 by the webbing 18. In the event the force on the seatbelt guide 20 exceeds the load-limiting threshold, the seatbelt guide 20 moves downwardly while compressing the spring 22 to limit force of the webbing 18 across the occupant.

The load-limiting assembly 10 is supported by the pillar 14, i.e., the weight of the load-limiting assembly 10 is borne by the pillar 14. The load-limiting assembly 10 is fixed to the pillar 14, e.g., with an adjustment track 80, fastener, welding, adhesive, etc. As an example, the load-limiting assembly 10 may include a frame 44 that supports the spring 22 and the seatbelt guide 20 and the frame 44 may be supported by and fixed to the pillar 14. In such an example, the frame 44 may include a lower plate 46, an upper plate 48 above the lower plate 46, and a pair of tracks 42 spaced from each other and extending along the axis A between the lower plate 46 and the upper plate 48. The lower plate 46 and/or the tracks 42 may be fixed to the pillar 14 directly or indirectly, for example, as described above, connected by the adjustment track 80, fastener, welding, adhesive, etc. The tracks 42 may extend from the lower plate 46 to the upper plate 48, as in the example shown in the figures.

The load-limiting assembly 10 may be adjustable upwardly and downwardly relative to the pillar 14, i.e., along the axis A, between a plurality of fixed positions. Specifically, the load-limiting assembly 10 may be adjustable between the fixed positions by an occupant. When adjusted to a fixed position, the frame 44 is locked to the pillar 14 and the seatbelt guide 20 is supported on the frame 44 by the spring 22. Specifically, the pillar 14 may include the adjustment track 80 that guides the frame 44 to the various positions and the frame 44 is locked to the adjustment track 80 in any one of the fixed positions. The occupant may lock and unlock the frame 44 in the fixed position with a locking mechanism 82 such as, for example, spring-loaded pins, solenoids, etc. The adjustment track 80 and the locking mechanism 82 and/or housing 84 may include corresponding channels and sliders along the axis A (e.g., dove-tail channels, T-shaped channels, etc., and corresponding sliders) to guide relative movement of the load-limiting assembly 10 along the axis A. In the example shown in the figures, the adjustment track 80 includes holes and the locking mechanism 82 includes a pin retractably extendable into any of the holes based on position of the frame 44 along the pillar 14. Specifically, the occupant may operate the locking mechanism 82 by manual operation (through a push-button, lever, etc.) or electronic operation (through a switch, human-machine interface, etc.) to lock and unlock the frame 44 relative to the pillar 14. In such an example, the occupant initially sets the position of the load-limiting assembly 10 relative to the pillar 14 and leaves the load-limiting assembly 10 in that position during operation of the vehicle 12. When locked in one of the fixed positions, the frame 44 of the load-limiting assembly 10 is immovable relative to the pillar 14 absent unlocking by the occupant by operation of the locking mechanism 82. As another example, the frame 44 may be fixed in one immoveable position relative to the pillar 14, e.g., by welding, fasteners, adhesive, etc.

In the example shown in the figures, the load-limiting assembly 10 includes the housing 84 that supports the track 42 on the pillar 14 and the housing 84 is selectively moveable relative to the pillar 14. The housing 84 may be a component of the frame 44 of the load-limiting assembly 10. Specifically, the lower plate 46 and/or the tracks 42 may be fixed relative to the housing 84, e.g., by direct connection with, for example, fasteners, welding, adhesive, etc., or may be unitary with the housing 84. The lower plate 46 and/or the tracks 42 moves as a unit with the housing 84 relative to the pillar 14. The locking mechanism 82 may be fixed to the housing 84, as shown in the example in the figures. The housing 84 may include a lower wall, an upper wall, and two side walls, as shown in the example shown in the figures. The load-limiting assembly 10 may include two locking mechanisms 82, each on a respective side wall of the housing 84 and, in such an example, two adjustment tracks 80 may be on the opposing sides of the pillar 14, respectively.

Figure 2:
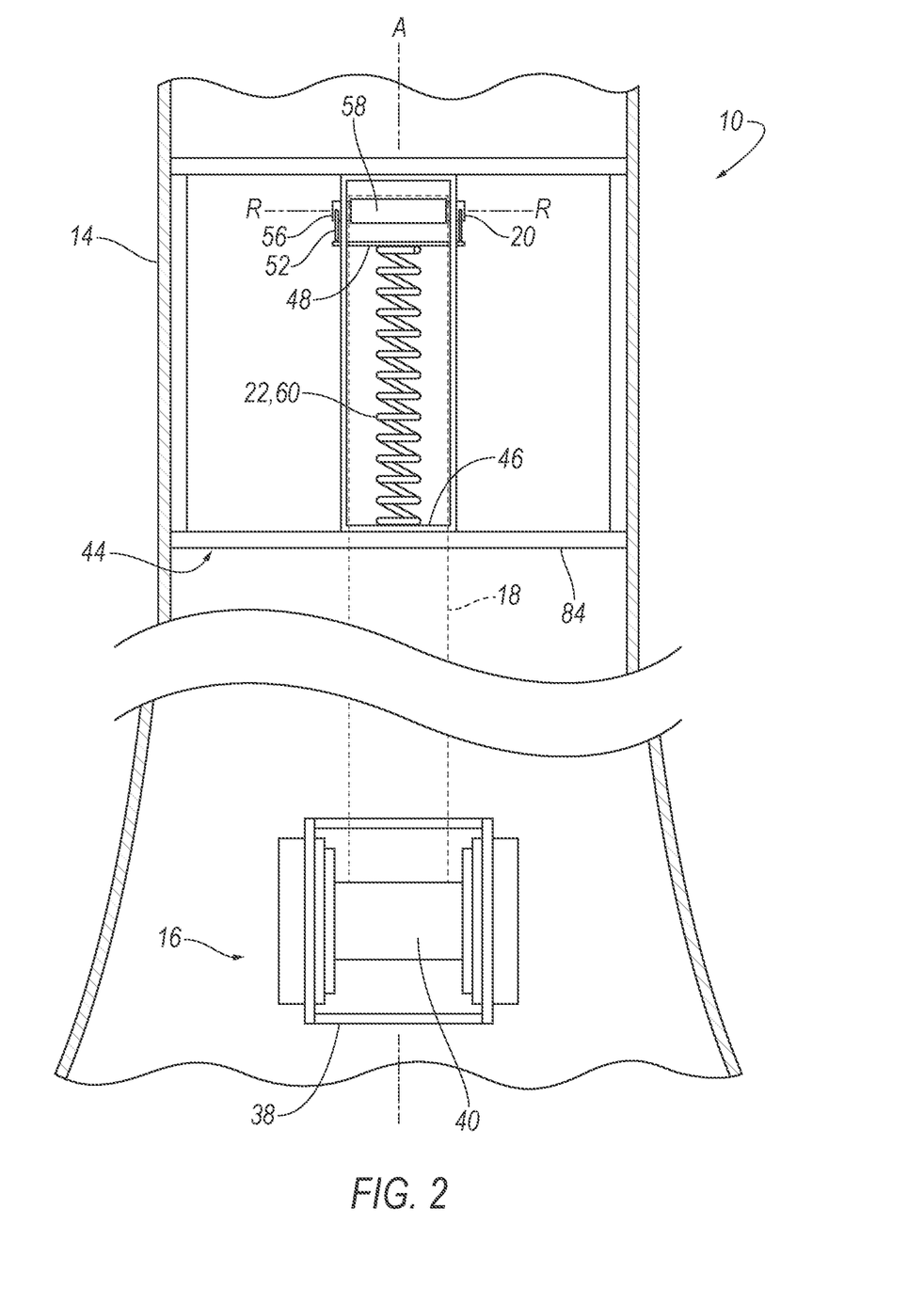
FIG. 2 is a side view of the pillar, the load-limiting assembly, and a portion of the seatbelt assembly.
Figure 3:
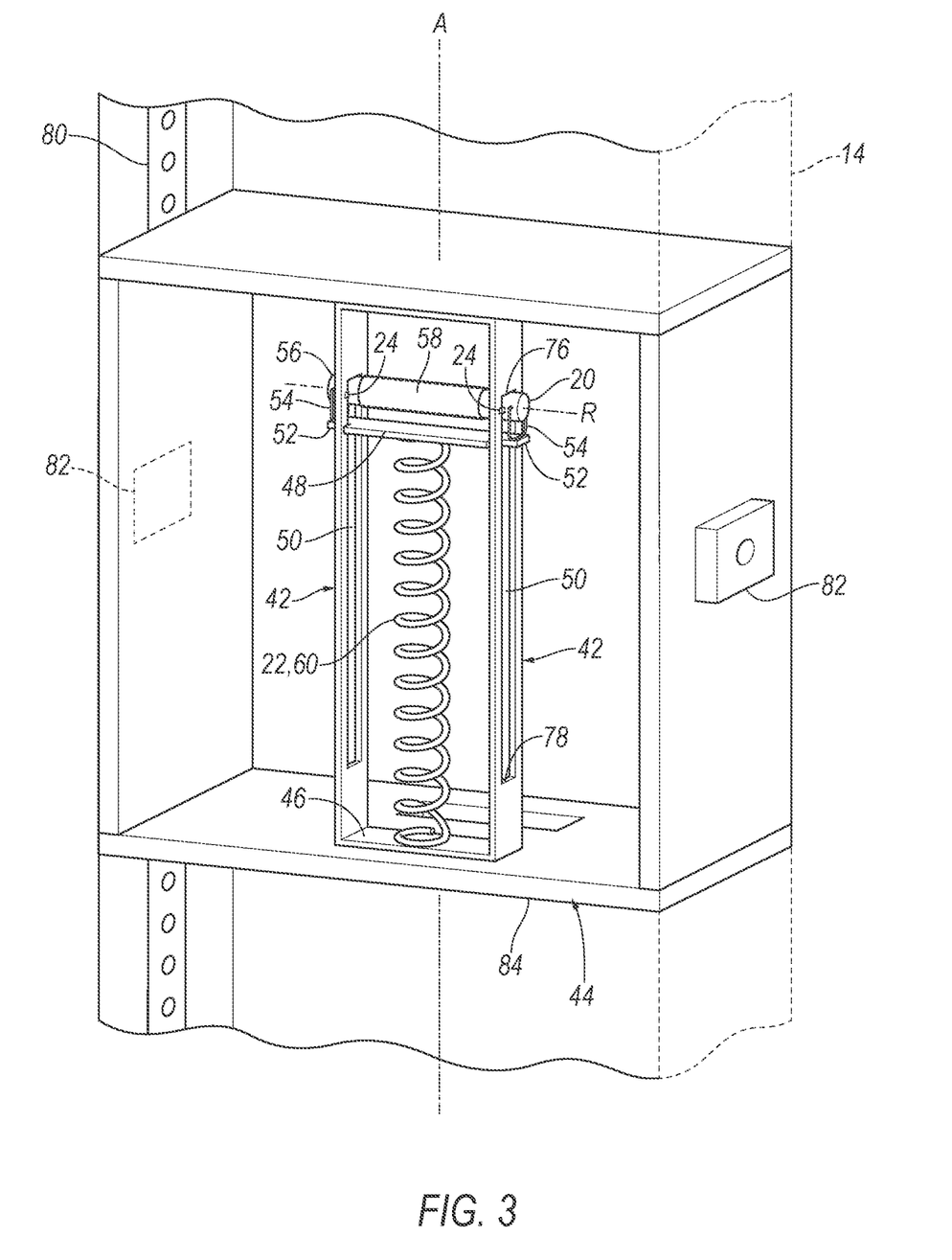
FIG. 3 is a perspective view of a portion of the pillar and the load-limiting assembly.

With reference to FIGS. 2 and 3, the lower plate 46 and the upper plate 48 are spaced from each other along the axis A. The lower plate 46 is below the spring 22, the upper plate 48, and the seatbelt guide 20. The retractor 16 may be below the lower plate 46 such that the webbing 18 extends upwardly from the retractor 16, past the lower plate 46, to the seatbelt guide 20. The lower plate 46 and the upper plate 48 are in planes transverse to the axis A. For example, the axis A may be normal to the lower plate 46 and the upper plate 48. The tracks 42, the lower plate 46, and the upper plate 48 may be of any suitable material, e.g., steel, aluminum, fiber reinforced composite, etc.

As set forth above, the track 42 of the frame 44 is elongated along the axis A. The track 42 guides movement of the seatbelt guide 20 when the seatbelt guide 20 moves against the bias of the spring 22. Specifically, the track 42 guides movement of the seatbelt guide 20 along the axis A.

In the example shown in the figures, the load-limiting assembly 10 includes two tracks 42. The tracks 42 may be spaced from each other along the vehicle-longitudinal axis of the vehicle 12. The pair of tracks 42 are oriented such that the seatbelt guide 20 is moveable along the axis A in the tracks 42. For example, in the example shown in the figures, the track 42 includes the slot 50 elongated along the axis A. The seatbelt guide 20 is moveably engaged with the slot 50, i.e., the seatbelt guide 20 moves along the slot 50 and the slot 50 restricts movement of the seatbelt guide 20 along the axis A when force on the seatbelt guide 20 exceeds the initial deformation threshold of the spring 22. In the example shown in the figures, ends of the seatbelt guide 20, e.g., a rod 56 of the seatbelt guide 20) extend through the slots 50 and slide along the slots 50 as the seatbelt guide 20 moves relative to the track 42. The ends of the rod 56 may be retained in the slots 50 during the entire movement of the seatbelt guide 20 along the slots 50 through the full compression and resilient return of the seatbelt guide 20.

The slot 50 includes a terminal upper end 76. The slot 50 narrows at the terminal upper end 76 to prevent upward movement of the seatbelt guide 20 upwardly beyond the upper end 76. The slot 50 terminates at the terminal upper end 76 in that the seatbelt guide 20 cannot move upwardly at the terminal upper end 76. Specifically, the seatbelt guide 20 abuts the terminal upper end 76 of the slot 50 at rest, i.e., when no forces pulling the downwardly on seatbelt guide 20 by the webbing 18 exceed the load-limiting threshold. The slot 50 may be completely closed at the terminal upper end 76, as shown in the example in the figures. The slot 50 may include a terminal lower end 78. In such examples, the terminal lower end 78 limits downward movement of the seatbelt guide 20 in the slot 50, i.e., to stop the seatbelt guide 20 and to provide limited release of the webbing 18.

As set forth above, the seatbelt guide 20 abuts the terminal upper end 76 of the slot 50 at rest. The seatbelt guide 20 is moveable along the slot 50 away from the terminal upper end 76 of the slot 50 when the webbing 18 exerts force on the webbing 18 that exceeds an initial deformation threshold of the spring 22. In other words, the spring 22 maintains the seatbelt guide 20 abutting the terminal upper end 76 of the slot 50 when forces exerted by the webbing 18 on the seatbelt guide 20 are below the initial deformation threshold of the spring 22. When force exerted by the webbing 18 on the seatbelt guide 20 reaches the initial deformation threshold of the spring 22, the spring 22 begins to deform. Force exerted by the webbing 18 on the seatbelt guide 20 exceeding the initial deformation threshold of the spring 22 compresses the spring 22 pay out a limited amount at the seatbelt guide 20.

The initial deformation threshold of the spring 22 may be the same as the load-limiting threshold of the load-limiting assembly 10. In other words, the initial deformation threshold of the spring 22 may partly or entirely define the load-limiting threshold of the load-limiting assembly 10. The initial deformation threshold and/or the load-limiting threshold, for example, may be empirically calculated based on chest compression during vehicle impact. The characteristics of the spring 22 may be designed based on the load-limiting threshold of the load-limiting assembly 10, With reference to FIGS. 2-4, the upper plate 48 is supported by the pillar 14 between the seatbelt guide 20 and the spring 22. Specifically, the upper plate 48 is supported by the frame 44 between the seatbelt guide 20 and the spring 22. In the example shown in the figures, the frame 44, and specifically the lower plate 46, is supported by a lower wall of the housing 84 and the tracks 42 are connected to side walls of the housing 84.

At least a portion of the track 42 is disposed between the upper plate 48 and the lower plate 46. The upper plate 48 is moveably engaged with the track 42. For example, in the example shown in the figures, upper plate 48 is moveably engaged with the slot 50, i.e., the upper plate 48 moves along the slot 50 and the slot 50 restricts movement of the upper plate 48 along the axis A. In the example shown in the figures, wings 52 of the upper plate 48 extend through the slots 50 and slide along the slots 50 as the seatbelt guide 20 moves the upper plate 48 relative to the track 42. The wings 52 may be retained in the slots 50 before and during movement of the seatbelt guide 20 along the slot 50 in compression and in return to the terminal upper end 76 of the slot 50.

The upper plate 48 may be spaced from the seatbelt guide 20. The load-limiting assembly 10 may include at least one riser 54 (two risers 54 in the example shown in the figures) between the upper plate 48 and the seatbelt guide 20. In such an example, the riser 54 may retain the upper plate 48 in contact with the spring 22. Upon loading of the spring 22, the riser 54 may transmit force from the seatbelt guide 20 to the upper plate 48 to transmit force from the seatbelt guide 20 to the spring 22.

With reference to FIGS. 1-3, the seatbelt guide 20 is supported by the pillar 14. In other words, the weight of the seatbelt guide 20 is borne by the pillar 14. In the example shown in the figures, the seatbelt guide 20 is indirectly supported by the pillar 14. Specifically, the seatbelt guide 20 is supported by the frame 44 and the frame 44 is supported by the pillar 14 (specifically, the housing 84 is supported by the pillar 14 through the housing 84). In the example shown in the figures, the seatbelt guide 20 is supported by the tracks 42. With reference to FIGS. 2-5, the rod 56 may extend from one track 42 to the other track 42, and specifically, may extend through the slots 50 on the tracks 42.

Figure 4:
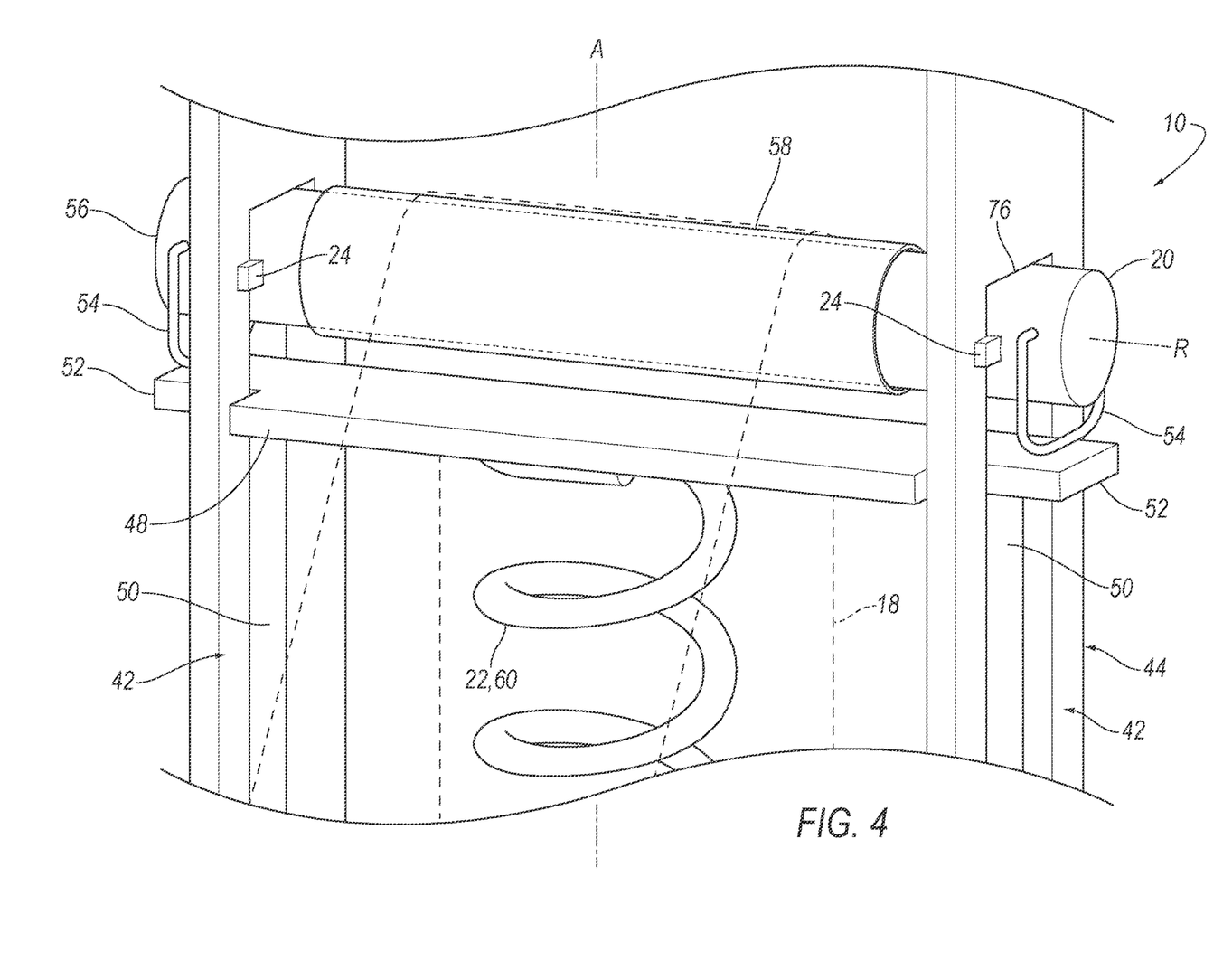
FIG. 4 is a magnified view of a portion of the load-limiting assembly including tracks, a seatbelt guide supported by the tracks by a spring below the seatbelt guide with the spring biasing the seatbelt guide against a terminal upper end of a slot of the track.

The seatbelt guide 20 includes the rod 56, as introduced above, and may include a sleeve 58 rotatably supported on the rod 56. With reference to FIGS. 1 and 4, the webbing 18 is supported by the rod 56 and the spring 22 supports the rod 56 on the frame 44. Specifically, in the example shown in the figures, the webbing 18 is supported by the sleeve 58 on the rod 56.

The rod 56 is elongated along a rod axis R. The rod axis R extends along the vehicle-longitudinal axis and, in some examples, may be generally parallel to the vehicle-longitudinal axis. As shown in the figures, the webbing 18 turns around the rod 56 about the rod axis R, i.e., extends upwardly from the retractor 16 to the seatbelt guide 20 and turns around the rod axis R and extends downwardly toward the anchor 32. The rod 56 may cylindrical, as shown in the figures. The rod 56 may be of any suitable material, e.g., steel, aluminum, plastic, composite, etc. In examples not including the sleeve 58, the webbing 18 slides directly on the rod 56 as the webbing 18 extends from and retracts into the retractor 16 and during movement of the seatbelt guide 20. In such examples, the rod 56 may be of a material or may include a coating that reduces friction with the webbing 18 as the webbing 18 moves relative to the rod 56.

Figure 5:
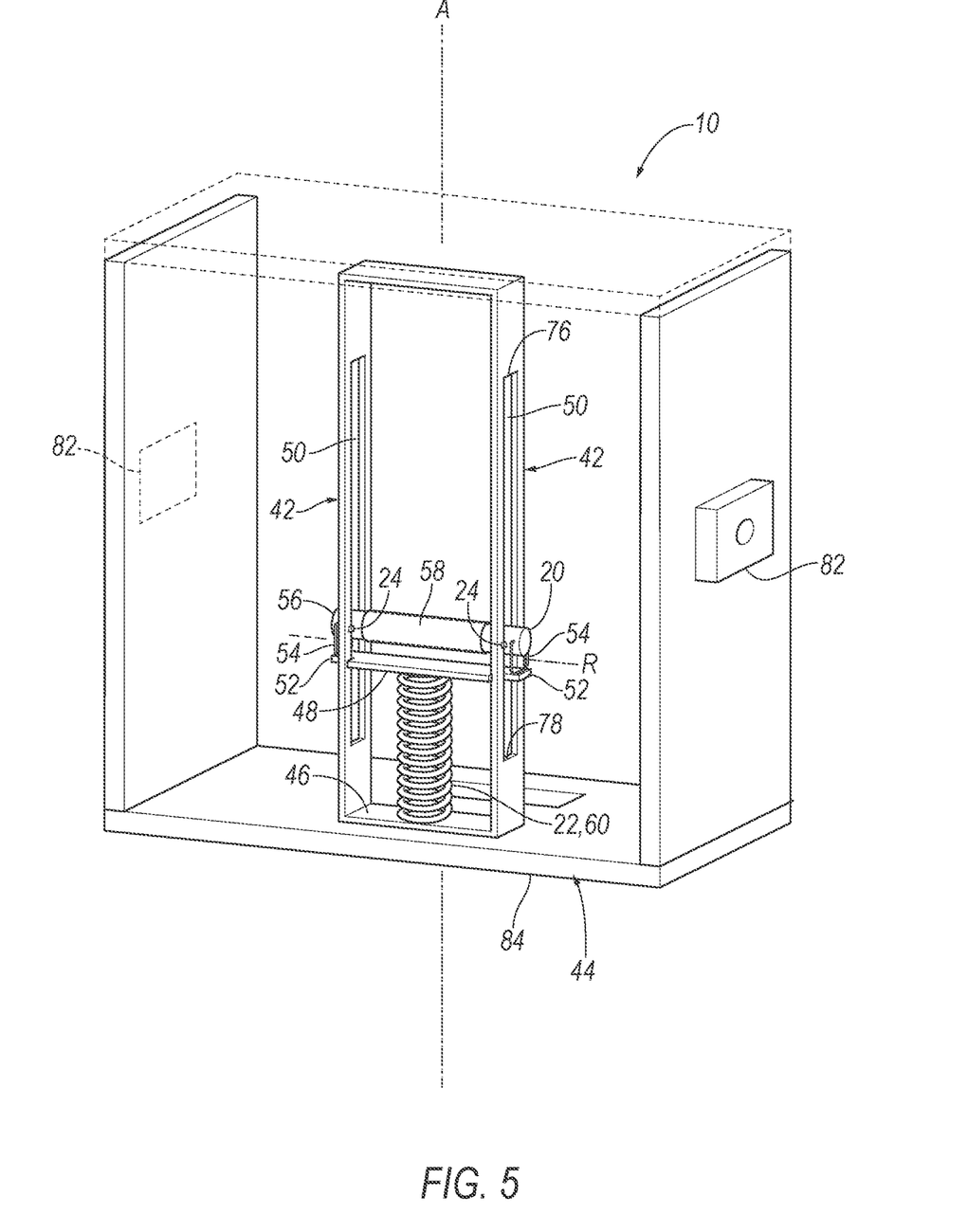
FIG. 5 is a perspective view of the load-limiting assembly with the seatbelt guide compressing the spring.

In some examples, the seatbelt guide 20 may include the sleeve 58, as shown in the example in FIGS. 4 and 5. In such examples, the sleeve 58 extends endlessly around the rod 56 about the rod axis R. The sleeve 58 may be elongated along the rod axis R. The sleeve 58 is rotatably supported on the rod 56 and freely rotates about the rod axis R. The sleeve 58 and the rod 56 are designed for the sleeve 58 to rotate freely relative to the rod 56. For example, the sleeve 58 and the rod 56 are sized and shaped for the sleeve 58 to rotate about the rod 56. The rod 56 may be cylindrical, as set forth above, and the sleeve 58 may be an annular cylinder that annularly extends round rod 56. The rod 56 and/or the sleeve 58 may include friction-inhibiting material or coatings between the rod 56 and the sleeve 58 to encourage free rotation therebetween. The seatbelt guide 20 may include bearings between the sleeve 58 and the rod 56. As the webbing 18 is extended from and retracted into the retractor 16, the webbing 18 moves over the seatbelt guide 20 and the sleeve 58 rotates on the rod 56. The sleeve 58 may be of any suitable material, e.g., steel, aluminum, plastic, composite, etc. The sleeve 58 may be of the same or different material as the rod 56.

With reference to FIGS. 4 and 5, the seatbelt guide 20 is moveable relative to the pillar 14 along the axis A. Specifically, the seatbelt guide 20 moves downwardly along the track 42 against the bias of the spring 22 when the force of the seatbelt guide 20 exceeds the load-limiting threshold. The seatbelt guide 20 moves relative to the pillar 14 along the axis A against the bias of the spring 22. As an example, the seatbelt guide 20 may move relative to the pillar 14 in parallel with the axis A against the bias of the spring 22.

When the retractor 16 is in the unlocked position, the webbing 18 freely extends from and retracts into the retractor 16 and, during this movement of the webbing 18, the webbing 18 moves across the seatbelt guide 20 and the seatbelt guide 20 supports webbing 18. Specifically, the spring 22 supports the seatbelt guide 20 the webbing 18 on the frame 44. When the seatbelt retractor 16 is in the locked position, extension of webbing 18 from the retractor 16 is restricted such that force on the webbing 18 is transmitted to the seatbelt guide 20. When the force on the seatbelt guide 20 from the webbing 18 exceeds the load-limiting threshold, e.g., due to forces exerted on the webbing 18 by an occupant during a vehicle impact, the seatbelt guide 20 can move downwardly under the force of the webbing 18 against the bias of the spring 22. This, for example, may limit chest compression by the webbing 18 on the occupant.

With reference to FIGS. 2-4, the spring 22 is between the vehicle pillar 14 and the seatbelt guide 20. In other words, in the event the seatbelt guide 20 moves along the track 42 during application of force exceeding the initial deformation threshold of the spring 22, the spring 22 is compressed between the seatbelt guide 20 and the vehicle pillar 14. Specifically, in the example shown in the figures, the spring 22 is between the frame 44 and the seatbelt guide 20. Since the frame 44 is fixed to the pillar 14, the pillar 14, through the frame 44, provides a reaction surface that receives forces from the spring 22. In the example shown in the figures, the spring 22 is supported on the lower plate 46 between the lower plate 46 and the seatbelt guide 20. The spring 22 may be retained to the lower plate 46, e.g., by staking, fastener, adhesive, welding, etc.

The seatbelt guide 20 may be spaced from spring 22. For example, as described above, in the example shown in the figures, the upper plate 48e1 and the risers 54 are between the spring 22 and the seatbelt guide 20. The spring 22 may abut the upper plate 48. The spring 22 may be free of a connection to the upper plate 48 or may be retained to the upper plate 48, e.g., by staking, fastener, adhesive, welding, etc.

In the example shown in the figure, the spring 22 abuts both the lower plate 46 and the upper plate 48 at rest, i.e., in the absence of application for force to the seatbelt guide 20 that exceeds the initial deformation threshold of the spring 22. the coil spring 60 extends from the lower plate 46 to the upper plate 48 and abuts both the lower plate 46 and the upper plate 48. In the example shown in FIGS. 7-8, the first coil spring 62 extends from the lower plate 46 to the upper plate 48 and abuts both the lower plate 46 and the upper plate 48.

In the example shown in the figures, in the event that force on the webbing 18 transmitted to the seatbelt guide 20 exceeds the initial deformation threshold of the spring 22, the force of the webbing 18 on the seatbelt guide 20 forces the seatbelt guide 20 downwardly along the slots 50. As the seatbelt guide 20 moves downwardly, the seatbelt guide 20 acts against the bias of the spring 22 to compress the spring 22.

The spring 22 is designed to absorb energy from the seatbelt guide 20 and webbing 18 during downward movement of the seatbelt guide 20 against the bias of the spring 22. The spring 22 may be of any suitable type that resiliently absorbs energy from the seatbelt guide 20 during downward movement of the seatbelt guide 20 against the bias of the spring 22. In other words, after removal of the load from the spring 22, the spring returns to its pre-load state. Specifically, in the pre-load state the spring 22 biases the seatbelt guide 20 against the terminal upper ends 76 of the slots 50 at the initial deformation threshold.

As set forth above, in the example shown in FIGS. 2-6, the energy absorber 22 is a coil spring 60. The coil spring 60 is loaded by downward movement of the seatbelt guide 20 against the bias of the coil spring 60. The coil spring 60 may have a linear spring constant, as shown in the example in the figures. In other examples, the coil spring 60 may have a non-linear spring constant. The coil spring 60 may be metal or any suitable material.

Figure 6:
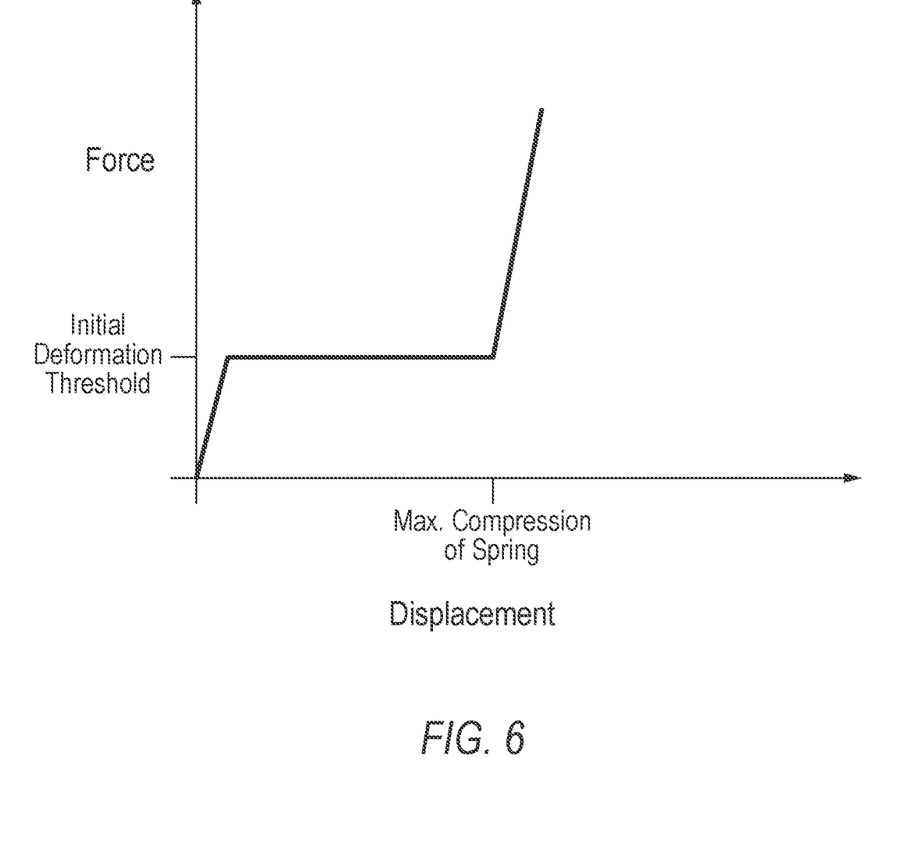
FIG. 6 is a hypothetical graph showing operation of the example of the load-limiting assembly of FIGS. 2-5.

FIG. 6 is a hypothetical representation of the payout of the webbing 18 relative to the force applied by the webbing 18 to the seatbelt guide 20 during application of force exceeding the initial deformation threshold of the spring 22 for the example in FIGS. 2-5. As shown in FIG. 6, the webbing 18 is initially paid out a limited amount at the seatbelt guide 20 during initial compression of the spring 22. The initial payout of the webbing 18 at the seatbelt guide 20 may be a result of downwardly movement of the seatbelt guide 20 relative to the upper plate 48, e.g., in an example in which the risers 54 release the seatbelt guide 20 relative to the upper plate 48 or in the example in which the load-limiting assembly 10 does not include the riser 54. As the seatbelt guide 20 compresses the spring 22 against the bias of the spring 22, the seatbelt guide 20 continues to move downwardly and pay out a limited amount of webbing 18 at the seatbelt guide 20. When the spring 22 is fully compressed, downwardly movement of the seatbelt guide 20 is stopped by the fully-compressed spring 22 and the no further payout of webbing 18 occurs from movement of the seatbelt guide 20.

The force required to further load the coil spring 60 increases as the coil spring 60 compresses. Accordingly, the coil spring 60 provides progressive load limiting to the seatbelt guide 20. In the example shown in FIG. 6, the energy absorber 22 has a linear spring constant. In such an example, the load-limiting assembly 10 releases the webbing 18 at a linear rate as increased force is applied to the webbing 18, i.e., webbing 18 is paid out at a constant rate at the seatbelt guide 20 as force on the webbing 18 increases. In other examples, the energy absorber 22 may have a non-linear spring constant.

In the example shown in FIG. 7, the load-limiting assembly 10 may include two springs, i.e., a first spring and a second spring. In the example shown in the FIGS. 7-8, the first spring is the first coil spring 62 and the second spring is the second coil spring 64. The first coil spring 62 abuts both the lower plate 46 and the upper plate 48. The second coil spring 64 abuts one of the lower plate 46 and the upper plate 48 and is spaced from the other of the lower plate 46 and the upper plate 48. In the example shown in FIG. 7, the second coil spring 64 abuts the lower plate 46 and is spaced from the upper plate 48.

The first coil spring 62 and the second coil spring 64 are loaded by downward movement of the seatbelt guide 20 against the bias of the first coil spring 62 and the second coil spring 64. The first coil spring 62 and/or the second coil spring 64 may have a linear spring constant, as shown in the example in FIGS. 7-8. In other examples, the first coil spring 62 and/or the second coil spring 64 may have a non-linear spring constant. The first coil spring 62 and the second coil spring 64 may be metal or any suitable material.

The first coil spring 62 and the second coil spring 64 operate in parallel to the first coil spring 62 to provide progressive load limiting the webbing 18 in the event that force in the webbing 18 transmitted to the seatbelt guide 20 that exceeds the initial deformation threshold. Specifically, the second coil spring 64 is shorter than the first coil spring 62. In the example shown in the figures, an upper end of the first coil spring 62 is above an upper end of the second coil spring 64. In other words, the upper end of the first coil spring 62 is nearer the seatbelt guide 20 than the upper end of the second coil spring 64 such that the energy absorber 22 is partially loaded by downward movement of the seatbelt guide 20 before the second coil spring 64 is loaded by downward movement of the seatbelt guide 20. In other words, and compression of the second coil spring 64 is initiated only after compression of the first coil spring 62. After initiation of compression of the second coil spring 64, the seatbelt guide 20 concurrently loads the first coil spring 62 and the second coil spring 64 as the seatbelt guide 20 continues to move downwardly.

In the example shown in FIG. 7, the first coil spring 62 and the second coil spring 64 provide progressive load-limiting. In the example shown in FIG. 7, the first coil spring 62 and the second coil spring 64 each have a linear spring constant. The spring constant of the first coil spring 62 may be the same as or different than the spring constant of the second coil spring 64. In the example shown in FIG. 7, the first coil spring 62 and the second coil spring 64 are coaxial.

In the example shown in FIG. 7, as the first coil spring 62 is loaded, webbing 18 is paid out at the seatbelt guide 20 at a constant rate during compression of the first coil spring 62 before initiation of compression of the second coil spring 64. FIG. 8 is a hypothetical representation of the payout of the webbing 18 relative to the force applied by the webbing 18 to the seatbelt guide 20 during application of force exceeding the initial deformation threshold of the spring 22 for the example in FIG. 7. As the seatbelt guide 20 compresses the first coil spring 62 to the point at which compression of the second coil spring 64 is initiated, the webbing 18 is paid out at the seatbelt guide 20 at a constant rate during the simultaneous compression of both the first coil spring 62 and the second coil spring 64. The rate at which the webbing 18 is paid out at the seatbelt guide 20 relative to force on the webbing 18 is decreased upon initiation of compression of the second coil spring 64, i.e., the combination of the first coil spring 62 and the second coil spring 64 increases force required to move the seatbelt guide 20 downwardly against the combined bias of the first coil spring 62 and the second coil spring 64. The load-limiting assembly 10 progressively increases resistance to downward movement of the seatbelt guide 20 during the stage at which the first coil spring 62 is compressed prior to compression of the second coil spring 64 and the load-limiting assembly 10 progressively increases resistance to downward movement of the seatbelt guide 20 during the stage at which both the first coil spring 62 and the second coil spring 64 are simultaneously compressed.

This disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle pillar elongated along an axis;
a seatbelt retractor and a webbing retractably extendable from the seatbelt retractor, the seatbelt retractor being lockable from an unlocked position in which the webbing is extendable from and retractable into the seatbelt retractor to a locked position in which the seatbelt retractor restricts extension of the webbing from the seatbelt retractor;
a frame supported by the pillar and defining a slot elongated along the axis of the pillar, the slot having a terminal upper end;
a seatbelt guide slideably engaged with the slot;
the seatbelt retractor being below the seatbelt guide, the webbing extending upwardly from the seatbelt retractor around the seatbelt guide;
a spring between the frame and the seatbelt guide, the spring biasing the seatbelt guide upwardly along the axis against the terminal upper end of the slot; and
a second spring between the frame and the seatbelt guide, the second spring being shorter than the spring.

2. The assembly as set forth in claim 1, wherein the frame includes a lower plate fixed to the pillar, the spring being supported on the lower plate between the lower plate and the seatbelt guide.

3. The assembly as set forth in claim 2, wherein the seatbelt retractor is below the lower plate.

4. The assembly as set forth in claim 2, further comprising an upper plate slideably engaged with the slot between the seatbelt guide and the spring.

5. The assembly as set forth in claim 4, wherein the spring abuts the lower plate and the upper plate.

6. The assembly as set forth in claim 1, further comprising an upper plate slideably engaged with the slot between the seatbelt guide and the spring.

7. The assembly as set forth in claim 1, wherein the seatbelt retractor is fixed to the vehicle pillar.

8. The assembly as set forth in claim 1, wherein the seatbelt guide abuts the terminal upper end of the slot at rest and the seatbelt guide is moveable along the slot away from the terminal upper end of the slot when the webbing exerts force on the seatbelt guide that exceeds an initial deformation threshold of the spring.

9. The assembly as set forth in claim 1, wherein the spring and the second spring are coaxial.

10. The assembly as set forth in claim 1, wherein the pillar includes an adjustment track and the frame includes a locking mechanism that releasably engages the adjustment track.

11. An assembly comprising:
a frame including a slot elongated along an axis;
a seatbelt retractor and a webbing retractably extendable from the seatbelt retractor, the seatbelt retractor being lockable from an unlocked position in which the webbing is extendable from and retractable into the seatbelt retractor to a locked position in which the seatbelt retractor restricts extension of the webbing from the seatbelt retractor;
the slot is elongated and has a terminal upper end;
a seatbelt guide slideably engaged with the slot;

the seatbelt retractor being below the seatbelt guide, the webbing extending upwardly from the seatbelt retractor around the seatbelt guide;

a spring between the frame and the seatbelt guide, the spring biasing the seatbelt guide upwardly along the axis against the terminal upper end of the slot; and a second spring between the frame and the seatbelt guide, the second spring being shorter than the spring.

12. The assembly as set forth in claim 11, wherein the frame includes a lower plate, the spring being supported on the lower plate between the lower plate and the seatbelt guide.

13. The assembly as set forth in claim 12 further comprising:

an upper plate slideably engaged with the slot between the seatbelt guide and the spring, the spring abutting the lower plate and the upper plate; and the second spring abutting one of the lower plate and the upper plate and spaced from the other of the lower plate and the upper plate.

14. The assembly as set forth in claim 13, wherein the spring and the second spring are coaxial.

15. The assembly as set forth in claim 11, wherein the seatbelt guide abuts the terminal upper end of the slot at rest and the seatbelt guide is moveable along the slot away from the terminal upper end of the slot when the webbing exerts force on the seatbelt guide that exceeds an initial deformation threshold of the spring.

16. The assembly as set forth in claim 11, wherein the frame includes a locking mechanism configured to releasably engage an adjustment track on a vehicle pillar.

17. The assembly as set forth in claim 11, wherein the spring and the second spring are coaxial.

* * * * *